United States Patent
Ruckwied et al.

(10) Patent No.: US 6,216,738 B1
(45) Date of Patent: Apr. 17, 2001

(54) VALVE ARRANGEMENT WITH AT LEAST ONE VALVE UNIT COMPRISING SEVERAL ELECTRICALLY OPERATED VALVES

(75) Inventors: Dieter Ruckwied, Rechberghausen; Christian Waldeck, Ostfildern, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/383,823

(22) Filed: Aug. 27, 1999

(30) Foreign Application Priority Data

Sep. 5, 1998 (DE) .............................................. 198 40 596

(51) Int. Cl.[7] .................................................. F16K 11/00
(52) U.S. Cl. .......................................... 137/884; 137/560
(58) Field of Search ...................................... 137/884, 560

(56) References Cited

U.S. PATENT DOCUMENTS

| | | |
|---|---|---|
| 5,457,594 | 10/1995 | Stoll et al. . |
| 5,458,048 | 10/1995 | Hohner . |
| 5,666,994 | 9/1997 | Stoll et al. . |
| 5,765,589 | 6/1998 | Stoll et al. . |
| 5,887,623 * | 3/1999 | Nagai et al. .......................... 137/884 |

FOREIGN PATENT DOCUMENTS

| | | |
|---|---|---|
| 92 11 109 | 10/1992 | (DE) . |
| 44 13 657 | 11/1995 | (DE) . |
| 195 26 459 | 1/1997 | (DE) . |

* cited by examiner

Primary Examiner—John Fox
(74) Attorney, Agent, or Firm—Hoffmann & Baron, LLP

(57) ABSTRACT

A valve arrangement comprising at least one valve unit having several electrically operated valves, such unit possessing a bus station adapted to be connected with a serial bus controlled by a central station, the bus station being connected via control lines with electrical drives of the valves. The bus station comprises at least one serial connection adapted to be connected via a connecting cable with a serial/parallel converter of at least one further valve unit and/or at least one input module for the detection of sensor signals, the serial/parallel converter being connected via control lines with the electrical drives of the valves of this at least one further valve unit for the operation of the electrical drives of such valves by the bus station and/or via sensor lines with the sensors. The result is that the central bus station may have further valve units connected with it via a respective cable without the need for a respective separate bus station so that any desired further modifications of the system are possible.

20 Claims, 1 Drawing Sheet

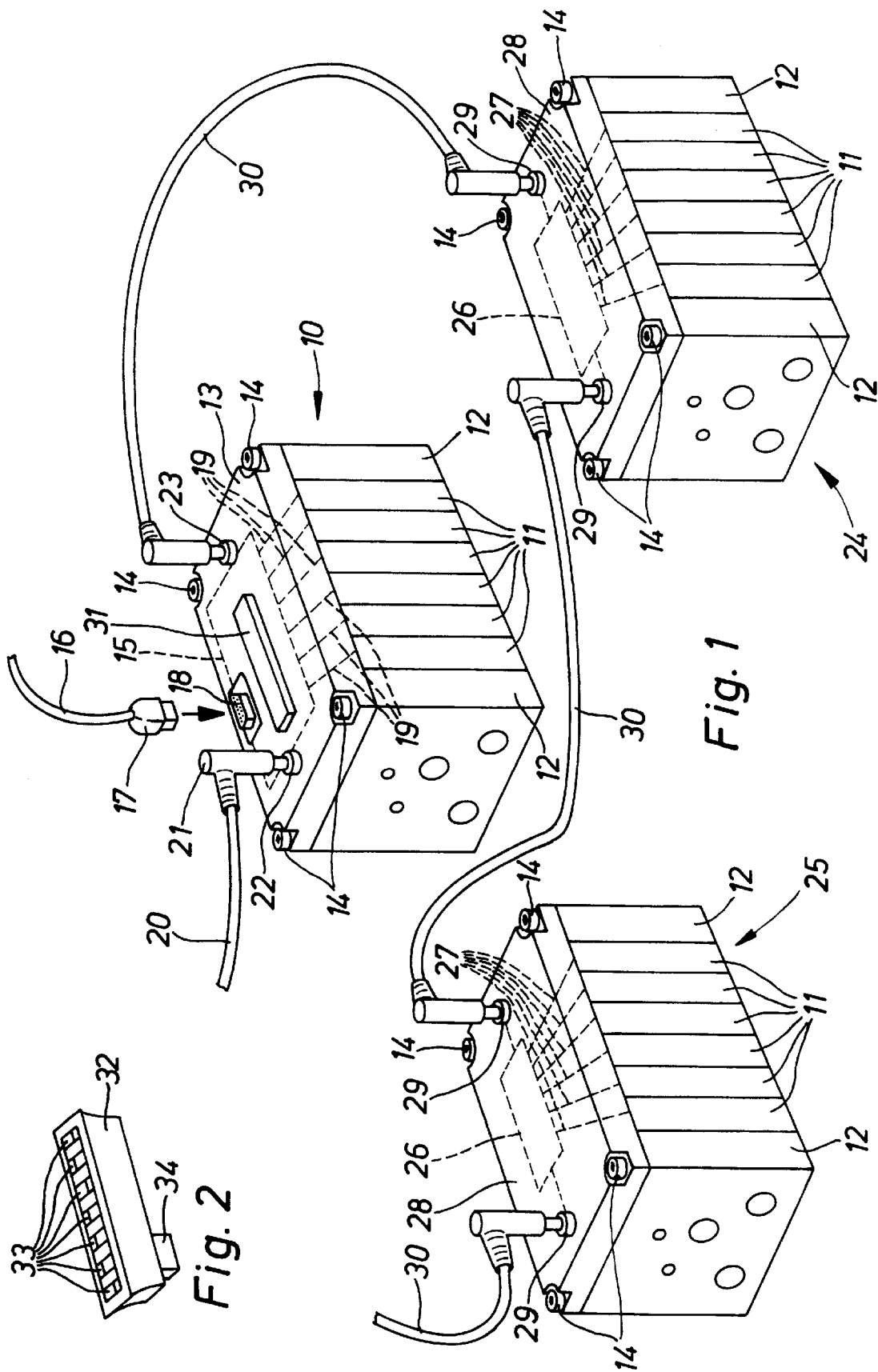

VALVE ARRANGEMENT WITH AT LEAST ONE VALVE UNIT COMPRISING SEVERAL ELECTRICALLY OPERATED VALVES

BACKGROUND OF THE INVENTION

The invention relates to a valve arrangement comprising at least one valve unit having several electrically operated valves, such unit possessing a bus station adapted to be connected with a serial bus controlled by a central station, the bus station being connected via control lines with electrical drives of the valves.

THE PRIOR ART

In the case of such valve arrangements, as are for example disclosed in the German patent publication 19,526,459, each valve unit requires its own bus station. If a new, additional valve unit is made part of the overall valve arrangement, same together with its bus station must be connected to the bus and the central station must be suitably re-programmed or additionally programmed. The addition of an additional valve unit is relatively complex and involves much labor and expense.

SHORT SUMMARY OF THE INVENTION

One object of the invention is thus to provide a valve arrangement of the initially described type in the case of which additional valve units may be added in a simple and inexpensive fashion.

In order to achieve these and/or other objects appearing from the present specification, claims and drawings, in the present invention the bus station comprises at least one serial connection adapted to be connected via a connecting cable with a serial/parallel converter of at least one further valve unit and/or at least one input module for the detection of sensor signals, the serial/parallel converter being connected via control lines with the electrical drives of the valves of this at least one further valve unit for the operation of the electrical drives of such valves by the bus station and/or via sensor lines with the sensors.

In the case of further development of the valve arrangement by having an additional valve unit same will not require a bus station of its own, something which also contributes to cost economy. The additional valve unit needs only to be connected via the connection cable and the corresponding serial connections with the central valve unit having the bus station. Since the control of the valves of such additional valve unit is via the bus station, it is merely necessary for same to adjusted for the extension of the system, whereas the central station and the bus are hardly affected by the change. It may possibly be necessary to re-configure the bus.

The further measures recited in the claims relate to advantageous developments and improvements in the novel valve arrangement.

The central valve unit provided with the bus station may conveniently possess a plug connecting means for the bus, which may be designed for electrical operation or as a light guide connection so that in this case a connection is possible simply by plugging in the bus line.

The at least one serial connection of the central valve unit and at least one serial connection of the at least one further valve unit or of the at least one input module is advantageously designed in the form of a plug connection for the connecting cable so that an additional valve unit may be connected by means of the connecting cable by simple plugging to the central valve unit or, respectively, to the bus station. Each valve unit and each input module in this case conveniently possesses two plug connections so that further valve units may be plug-connected without any difficulty and without any distributors being necessary.

The plug connections and the at least one connection cable are preferably also provided for power supply so that no additional wiring is necessary for power supply.

In an advantageous embodiment of the invention the valves of each valve unit are covered over by a plate-like housing part, which has the bus station or the serial/parallel converter and the electrical connections. Preferably the plate-like housing part of the central valve unit furthermore comprises a power supply unit, which makes available the different voltages required.

The plate-like part possesses plug connections for the individual electrical drives of the valves, which are so designed that on plugging the plate-like housing part in position on the valves placed in rows the necessary electrical connections are automatically produced as well and furthermore no extra wiring is necessary here either.

The plate-like housing parts provided with the bus station is best provided with a detachably pluggable adjustment and/or programming part for the bus station. In practical application the valve units are in fact frequently poorly accessible or it is difficult to see them so that adjustment and programming of control elements is only possible in situ in an extremely complex and awkward manner. In accordance with the invention it is now possible for the adjustment and/or programming part to be removed and be adjusted where lighting is good, for example on a desk. Adjustment can therefore for instance take place after installation of the entire valve arrangement. A further advantage is that on substitution of valve units during repair, the adjustment is maintained owing to the replaceable adjustment and/or programming part and does not have to be performed over again.

For the adjustment or programming the adjustment and/or programming part is either provided with adjustment switches or it possesses a memory able to be programmed by a computer, as for example an EPROM, an EEPROM or the like. In the latter case as well such adjustment and/or programming part may be removed and be programmed where lighting is good using a computer or some other programming unit.

The adjustment and/or programming part is conveniently provided with an electrical connecting plug, which on insertion of the adjustment and/or programming part into the plate-like housing part produces the electrical connections. This connection plug may serve as a connection for the programming computer in the case of a programmable memory comprised therein.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

FIG. 1 shows a valve arrangement comprising a central valve unit having a bus station and with which two further valve units are connected via flexible cables, as seen in perspective.

FIG. 2 shows an adjustment and/or programming unit provided with adjustment switches and able to be detachably plugged into the central valve unit.

DETAILED ACCOUNT OF WORKING EMBODIMENT OF THE INVENTION

The valve arrangement illustrated in FIG. 1 as a working embodiment of the invention comprises a central valve station 10 made up of six plate valves 11 placed in a row and having a substantially rectangular outline. Aligned with the two outer plate valves 11 of this stack of valve there is in each case an end or terminal plate 12 of suitable shape. Such a valve unit is for example disclosed in the German patent publication 4,413,657 and consequently does not need to be described in more detail. Each plate valve comprises for instance one principal valve and two pilot valves serving for controlling it, such pilot valves being able to be driven by electrical drives, as for example electromagnetic arrangements.

The arrangement of plate valves 1 and terminal plates 12 is covered over by a plate-like housing part 13, which is fixed in place by means of securing screws 14 on the two terminal plates 12. This housing part 13 comprises a bus station 15, which using serial bus lines arranged in a bus cable is able to be connected with a central station, not illustrated. It is naturally possible for further bus stations of other systems or valve arrangements to be connected in a conventional fashion with this central station or, respectively, the bus lines. For connection of the bus station 15 with the bus cable 16 the latter is provided with a plug 17, which is able to be plugged into a cooperating plug means 18 on the housing part 13. This housing connection may in principle be electrical or designed in the form of a light guide connection. For the operation of the plate valves 11 the bus station is connected by means of control lines 19 with the electrical drives of the individual plate valves 11. For this purpose the housing part 13 comprises the necessary valve drive means, which are not illustrated.

The supply of power to the central valve station 10 is by means of a supply cable 20, which is able to be connected by a plug 21 with a supply input jack 22 on the housing part 13. The housing part 13 contains a power supply part (not illustrated) for provision of the required voltages (e.g. for the bus station 15) for the bus station 15 from the input voltage (for example of 24 volts) provided via the supply cable 20.

The plate-like housing part 13 furthermore possesses an output jack 23 or socket, via which further valve stations 24 and 25 may be connected with the central valve station 10. These further valve stations 24 and 25 do not possess any bus station of their own, and serial/parallel converters 26 are only in the plate-like housing parts 28, which are similar to the plate-like housing part 13 in shape, such converters being respectively connected via control lines 27 with the electrical drives of the plate valves 11 of such further valve stations 24 and 25. In other respects the further valve stations 24 and 25 are similar to the central valve station 10 in structure and functionally equivalent parts are provided with the same reference numerals and not described over again.

Each of the additional valve stations 24 and 25 has two connection jacks 29, flexible connecting cables 30 being provided for connection of the output jack 23 with a further connecting jack 29 of the valve station 24 and a further connecting jack 29 of the valve station 24 with a connecting jack 29 of the valve station 25. A connecting cable, only indicated in part, on one of the connecting jacks 29 of the valve station 25 is to indicate that further additional valve stations can be connected. The flexible connecting cables 30 contain serial line for the transmission of control signals from the bus station 15 to the serial/parallel converters 26 and, respectively, to the electrical drives of the plate valves 11 of the additional valve stations 24 and 25. It is naturally possible as well for feedback signals, as for example sensor feedback signal to be transmitted back to the bus station 15 via the serial lines.

Instead of or in addition to the further valve stations 24 and 25 it is possible to provide input modules, which are not illustrated. These input modules possess, like the further valve stations 24 and 25, serial/parallel converters, which are able to be connected with the different sensors, for example for monitoring the terminal positions or other positions of power drive cylinders.

In a similar fashion such input modules possess connecting jacks 29, which can be connected accordingly with the central valve station 10 or with further valve stations 24 and 25. The sensor signals detected are then respectively converted into the serial signals and supplied via the flexible connecting cables 30 to the bus station 15. In this respect it is in principle also possible to combine such input modules with additional valve stations, that is to say such additional valve stations may then have sensor signals supplied to them.

The flexible connecting cables 30 furthermore contain power cables in order to supply the central valve station 10 with the necessary operating power from the further valve stations 24 and 25. For this reason the flexible connecting cables 30 constitute the only connecting lines and no other wiring is required.

Although it is in principle possible to adjust the bus station 15 from the central station, which is not illustrated, and to program it, it has turned out that in situ adjustment and/or programming is expedient and useful. For this purpose the central valve station 10 has plug site on the plate-like housing part 13, into which a memory or storage module 31 may be detachably plugged. For adjustment and/or programming of the bus station 15 the memory module 31 is pulled out and may be programmed and adjusted at a workplace using a computer or some other programming means. After this it is re-plugged in the housing part 13. A change in the adjustment or the programming is for example then necessary, when an additional valve station is added, for adjustment of the bus address, when the number of plate valves 11 is changed, when the functions of individual plate valves are changed or the like. For this purpose the memory module 31 has a non-volatile memory such, as an EPROM, an EEPROM or a battery-boosted working memory. The plug contacts of the memory modules 15 may simultaneously serve for connection with the programming unit.

The bus station 15 may also be designed for the automatic running of control or checking programs, which may run independently of control by the central station. This means that there is de-centralized automation as part of a small flexible and economic design.

As a modification of the design illustrated in FIG. 1 it is possible to use the adjustment module 32 illustrated in FIG. 2, which is able to be plugged into the housing part 13, instead of the memory module 31. This adjustment module 32 comprises adjustment switches 33, which can be in the form of so-called DIP or DIL switches. Furthermore using these adjustment switches 33 it is possible to perform adjustments and simple programming operations, as for example the setting of addresses or the like. It is naturally also possible to provide combined plug-in modules, which contain both adjustment switches and also memories. In each case the respective module is withdrawn for adjustment or programming from the housing part 13 and the necessary adjustment and programming operations may be performed at the workplace where there is sufficient space and enough light.

In the illustrated embodiment the valve stations 10, 24 and 25 each comprises six plate valves 11. In principle it is naturally possible to have any desired number of plate valves 11 in a row. It is merely necessary to provide sufficiently large housing parts 13 and 28, which cover over the corresponding number of plate valves 11. In this respect it has turned out to be convenient to provide housing parts 13 and, respectively, 28 for stacks of four, six or eight plate valves.

The invention is naturally not limited to use for plate valves 11, and can be employed for valve stations, which have different arrangements of valves in rows.

In the working example all jacks 22, 23 and 29 are illustrated as being identical. For better distinction they may however be different to one another and for example the supply input jack 22 may possess a different configuration on the housing part 13, more especially when the same serve exclusively for power supply. On the other hand this input jack 22 may possess the same function as the output jack 23, i.e. additional valve stations may be connected with it as well. The power supply to the housing part 13 must then be in some other way, for example via the bus cable 16.

The housing parts 13 and 28 are illustrated in the working example as being integral. As a modification of the invention they may be designed in two parts in the form of superposed plates, the plate part resting on the plate valves 11 having plug connection or connection contacts for the different electrical drives of the plate valves 11 and furthermore has corresponding printed wiring or connecting lines, which lead to a plug contact arrangement for connection with the external second plate part. The second external plate part then comprises the electronic components and jacks or plugs described. The plugging together of the single- or two-part housing parts 13 and 28 on the valve arrangement means that the electrical connections are produced at the same time automatically.

The plate-like housing parts 13 and 28 may also comprises signal lamps for indicating the operational state of the individual plate valves 11.

What is claimed is:

1. A valve arrangement comprising a first valve unit having several electrically operated valves, the first valve unit including a bus station connectable to a central station, the bus station being further connected via control lines to electrical drives of each of the valves, wherein the bus station comprises at least one serial connection connectable via a connecting cable to a serial/parallel converter of at least a second unit, the second unit being operated by the bus station of the first valve unit.

2. The valve arrangement as set forth in claim 1, wherein the first valve unit includes a plug connection and a serial bus line for connection of the bus station to the central station.

3. The valve arrangement as set forth in claim 1, wherein the at least one serial connection of the first valve unit is in the form of one of a plug and a jack.

4. The valve arrangement as set forth in claim 3, wherein the second unit includes two connections in the form of plug connection means.

5. The valve arrangement as set forth in claim 3, further comprising at least one supply cable for connection to a power supply.

6. The valve arrangement as set forth in claim 1, wherein the valves of the first valve unit are covered by a plate-like housing part, the housing part including the bus station connections and the electrical connections.

7. The valve arrangement as set forth in claim 6, wherein the plate-like housing part includes electrical plug connections, the electrical plug connections being connectable to the valves to produce electrical connections for the individual electrical drives of the valves.

8. The valve arrangement as set forth in claim 6, wherein the plate-like housing part furthermore comprises a power supply part.

9. The valve arrangement as set forth in claim 1, wherein the valves are plate valves.

10. The valve arrangement as set forth in claim 6, wherein the plate-like housing part is provided with a detachably pluggable programming means for the bus station.

11. The valve arrangement as set forth in claim 10, wherein the programming means is provided with adjustment switches.

12. The valve arrangement as set forth in claim 10, wherein the programming means is provided with a memory able to be programmed using a computer or a programming device.

13. The valve arrangement as set forth in claim 10, wherein the programming means is provided with an electrical connecting plug, which on insertion of the programming means into the plate-like housing part produces electrical connections.

14. The valve arrangement as set forth in claim 7, wherein one of the electrical plug connections of the housing part is a power supply jack.

15. The valve arrangement as set forth in claim 1, wherein the bus station independently processes control programs.

16. The valve arrangement as set forth in claim 1, wherein the second unit is a second valve unit having several electrically operated valves and wherein the serial/parallel converter is connected via control lines to electrical drives of each of the valves of the second valve unit, the electrical drives of the second valve unit being operated by the bus station of the first valve unit.

17. The valve arrangement as set forth in claim 1, wherein the second unit is an input module having a plurality of sensors for the detection of sensor signals and wherein the serial/parallel converter is corrected via sensor lines to each of the sensors of the input module.

18. The valve arrangement as set forth in claim 2, wherein the plug connection means is of a light guide connection.

19. The valve arrangement as set forth in claim 1, wherein the second unit is covered by a plate-like housing part, the housing part including the serial/parallel converter and the electrical connections.

20. A valve arrangement comprising:

a central valve assembly having a plurality of individual electrically operated valves and a common bus station, each of the individual valves being controlled by the common bus station; and a subsidiary valve assembly having a serial/parallel converter electrically connected to the common bus station of the central valve assembly, the subsidiary valve assembly being controlled by the common bus station of the central valve assembly.

* * * * *